Dec. 28, 1937.　　　A. V. GULLBORG　　　2,103,944
SCREW PART AND DRIVER
Filed April 29, 1935　　　2 Sheets-Sheet 1
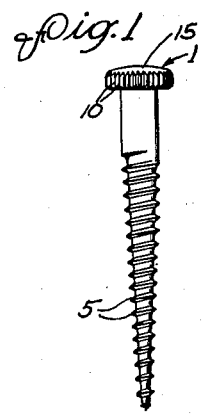
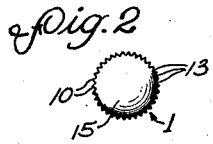
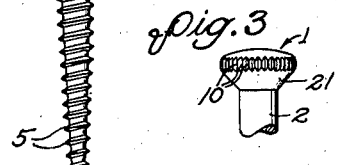
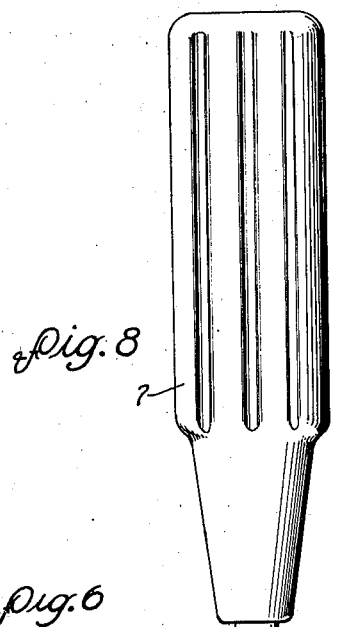
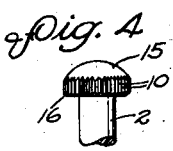
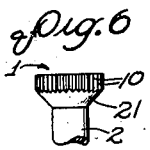
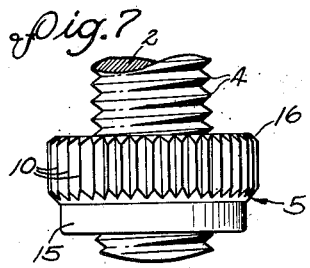
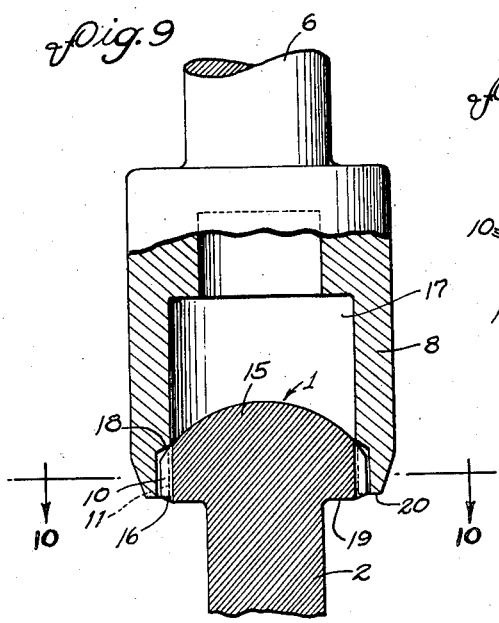
INVENTOR
Arthur V. Gullborg
By Parker, Carlson, Pitzner & Hubbard
ATTORNEYS Patented Dec. 28, 1937

2,103,944

UNITED STATES PATENT OFFICE 2,103,944

SCREW PART AND DRIVER

Arthur V. Gullborg, Chicago, Ill.

Application April 29, 1935, Serial No. 18,716

5 Claims. (Cl. 145—50)

This invention relates to improvements in general purpose screw parts commonly known as wood and machine screws or bolts which are formed with a solid metal enlargement or head to which a driving tool or wrench may be applied for the purpose of turning the screw into one of the parts which are to be clamped together thereby.

For the purpose of enabling a driving tool to be applied thereto, the heads of ordinary machine and wood screws and bolts are formed either of polygonal cross section or with a slot or other non-circular tool receiving recess. The standardized head constructions thus commonly used possess certain inherent disadvantages from the standpoint of appearance, ease and speed of driving, and the degree of tightness which may be obtained.

The general object of the present invention is to provide, in combination with a driving tool, a new and improved head construction which overcomes the objections inherent in the wood and machine screws heretofore used and possesses the following outstanding advantages, namely, presents a neater and more ornamental appearance than the slotted and hexagonal heads heretofore used, can be driven at higher speed and tightened to the desired degree with far less effort and attention than ordinary screws and without danger of the head becoming disfigured or the adjacent surfaces marred, and can be manufactured by high speed production methods at lower costs than slotted or hexagonal headed screws.

In carrying out the foregoing object, the invention contemplates generally the formation around the periphery of the screw head and parallel to the axis thereof of a multiplicity of fine sharply defined teeth or serrations so shaped and spaced and of such short radial length as to lend an artistic appearance to the head and yet afford sufficient surface area for enabling the head to be gripped properly by a driving tool having a socket formed with complemental notches for receiving the screw head.

Another object is to correlate the construction of serrations on the head and the driving tool in a novel manner such as to facilitate ready application of the tool to the screw head and allow for manufacturing tolerances necessary to permit cutting of the serrations by high speed production methods while at the same time providing for multiple surface engagement between the tool and head over a large effective area.

The invention also resides in the advantageous shape and spacing of the serrations and the manner of protecting the same in screws of types wherein the head is exposed after the screw has been driven.

Other objects and advantages of the invention will become apparent from the following detailed description taken in connection with the accompanying drawings, in which Figure 1 is an actual size elevational view of a wood screw having a one-half inch head of the so-called oval type and embodying features of the present invention.

Fig. 2 is a plan view of the screw head.

Figs. 3, 4, 5 and 6 are fragmentary views respectively illustrating the application of the invention to screws having a so-called oval countersunk head, a round or button head, a fillister head, and a flat countersunk head.

Fig. 7 is an enlarged fragmentary view of a bolt having a nut embodying the present invention.

Fig. 8 is an elevational view of one form of driving tool, the head receiving socket being partially broken away and shown in section.

Fig. 9 is an enlarged fragmentary sectional view showing the tool applied to a screw head.

Figure 10:
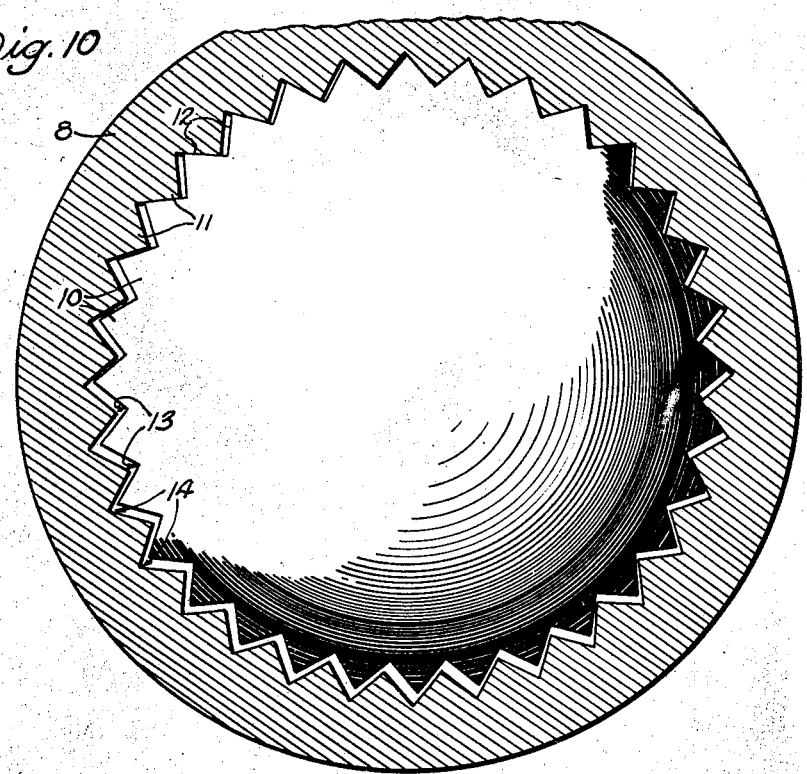
Figs. 10 and 11 are enlarged sectional views taken substantially along the line 10—10 of Fig. 9 with the axis of the screw head in different positions with respect to the axis of the tool.

While the invention is susceptible of various modifications and alternative constructions, I have shown in the drawings and will herein describe in detail the preferred embodiment as applied to typical classes of screw parts, but it is to be understood that I do not thereby intend to limit the invention by such disclosure, but aim to cover all modifications and alternative constructions and uses falling within the spirit and scope of the invention as expressed in the appended claims.

In the drawings, the invention is embodied for purposes of illustration in screws having solid metal heads 1 of various shapes integral with one end and symmetrical with respect to the axis of a shank 2 which may be formed wholly or partially throughout its length with wood screw threads 3 (Fig. 1) or with machine screw threads 4 (Figs. 5 and 7). Screws of this character are intended for general use in producing the clamping action for fastening two parts together and are commonly identified according to the shape of their heads which are known as oval head (Figs. 1 to 3), round or button head (Fig. 4), flat head (Fig. 6), and fillister head (Fig. 5), the latter preferably being employed on machine bolts. The invention is applicable equally well to other types of general purpose screws and to nuts 5 (Fig. 7) for use on machine bolts.

As above set forth, the screws are intended to be driven by the use of a special tool having a driving socket for receiving the serrated head of the screw. By way of example, I have shown in Fig. 8 a suitable tool comprising a shank 6 having at one end a suitable handle 7 and at its other end a head-receiving socket 8 adapted to fit over the head of the screw to be driven.

To enable the screw to be gripped by the tool and the necessary turning torque applied thereto, the invention contemplates the formation around the periphery of the screw head of a relatively large number of short fine teeth or serrations 10 which are coordinated in size, shape and spacing with complemental internal serrations 11 in the tool socket 8 so as to provide for multiple surface engagement between the two of relatively large effective area. The serrations 10 extend parallel to the axis of the screw and are generally V-shaped, that is to say, are formed with flat side surfaces 12 (Fig. 10) which substantially intersect with each other at the outer ends to define tips which preferably are as pointed as is practical with the high speed production methods by which the teeth are cut as will appear later. In order to form relatively large number of gripping surfaces, the serrations 10 are spaced close together so that the surfaces 12 of adjacent serrations intersect to define intervening V-shaped notches 13 in which the serrations 11 on the driving tool are received when the tool is applied to the screw head, the head serrations entering notches 14 between the tool serrations.

With the serrations constructed in the above manner, the number of serrations on a head of given diameter will be determined by the angle included between the adjacent sides of each serration and by radial lengths of the serrations. In order to form a head having an ornamental appearance, the serrations are made as short as is practicable while at the same time providing sufficient surface area with the clearances allowed to enable the head to be gripped properly under all conditions. To provide for a maximum contact area between the teeth 10 and 11 for a given clearance between the head and the tool socket, the angles at the tips of the serrations and at the roots of the notches on the tool and on the head are approximately ninety degrees. For a screw head one-half inch in diameter as shown in Figs. 1 and 2, there are preferably about thirty-four teeth and the radial length thereof is approximately .025 of an inch. Obviously, the number of teeth will vary with the size of screw, but even in screws of small size the number will be substantially greater than twelve. In view of the comparatively large number of serrations, the close spacing and the short radial length thereof and the similarly shaped intervening notches, it will be apparent that the exposed head of a driven screw will present a symmetrical and ornamental appearance.

The serrations 10 are made of such axial lengths as to afford the area of engagement with the tool serrations which is necessary for driving the screw under all conditions. This length varies with the type of head but for all of the screws shown in the drawings is not greater than five-eighths of the overall height of the head which is the approximate length of the serrations in the case of the oval head screw shown in Figs. 1 and 2. A somewhat smaller proportion of the axial length of the head is occupied by the serrations in the round and fillister head types (Figs. 4 and 5).

In those screws having heads which are ordinarily exposed when the screws are driven, the serrations are formed at the base portion of the head as shown in Figs. 1, 4 and 5 leaving a portion 15 projecting above the upper ends of the serrations and defining a continuous surface merging with the upper end surfaces of the serrations. This surface may be left smooth and of rounded contour as shown or may be formed with designs of any desired character. In addition to presenting an ornamental effect, the projection 15 serves to protect the serrations 10 against contact with objects which may strike the head of the driven screw. The danger of the serrations being deformed in service or tearing clothing or the like is effectually minimized. The convex or inclined ends of the heads also act as cam surfaces to guide the driving tool into alinement with the screw head thereby facilitating application of the tool.

To avoid the formation of burrs on the heads in the trimming operation by which the serrations 10 are cut, the base of the head is preferably beveled as indicated at 16 prior to trimming. This is, of course, unnecessary in the case of screws of the type shown in Figs. 3 and 5 having heads with tapered base portions 21. In the fillister heads (Fig. 5), the protecting projection 15 is of generally cylindrical shape somewhat smaller in diameter than the serrated base portion of the head.

In spite of the comparatively short lengths of the serrations 10, it is possible to provide an effective area of gripping engagement between the head and tool serrations which is necessary for application of the required driving torque without at the same time necessitating such a close fit between the head and tool socket as to render application of the tool difficult and manufacture of the screws by high speed production methods prohibitive. This important advantage of the present head construction is due to the generally V-shaped and flat sided character and close uniform spacing of the head and tool serrations which permit of a substantial degree of clearance between the tool socket and the screw head while at the same time providing for uniform distribution of the turning torque to the different serrations and for a relatively large combined area of surface contact between the tool and head serrations.

Figure 11:
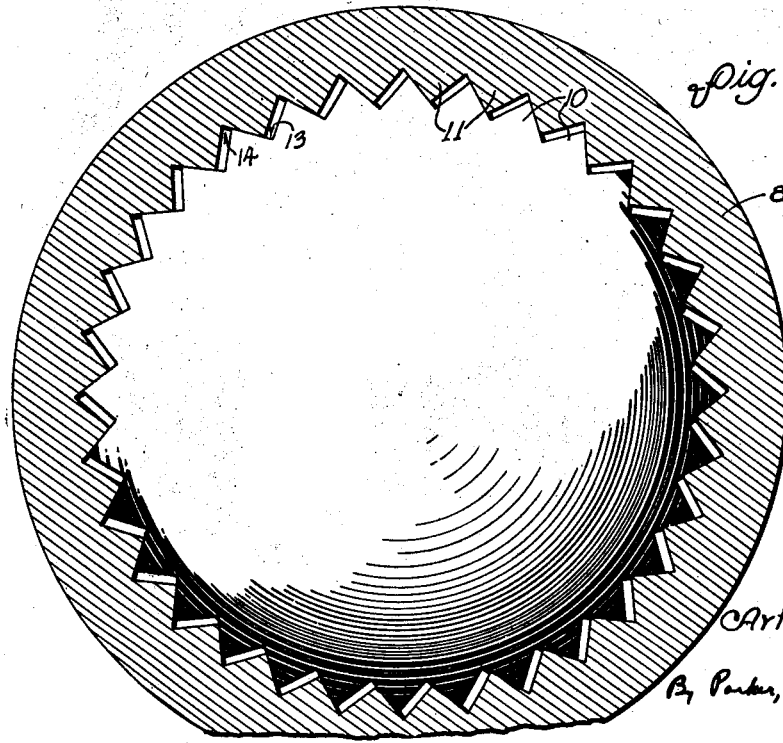

Referring now to the large scale views, Figs. 10 and 11, it will be seen that the head and tool serrations are of substantially the same shape and included angle and that the internal diameter of the tool socket 8 at the roots of the notches 14 is somewhat greater than the overall diameter of the screw head. Because of substantial clearance provided by this difference in the pitch diameters of the screw and tool serrations, coupled with the pointed shape and narrow circumferential width of the serrations 10, it will be apparent that the screw head will enter the tool socket readily without the necessity of accurately mating the head serrations with the notches 14 in the tool. Thus, the tool socket may be applied to the screw head in axially offset relation as shown in Fig. 10 with many of the tool and head serrations out of actual contact with each other. Owing to the inclination of the surfaces of the tool serrations 11 relative to radii therethrough, these surfaces will, in the slight angular movement between the head and the tool which occurs when a torque is applied to the tool, exert a cam action on surfaces 12 engaged thereby which action effects a bodily shifting of the screw head toward centered position in the tool socket until all of the tool serrations are in contact with the screw serrations as shown in Fig. 11. The same action occurs in either direction of rotation of the tool. The tool is thus rendered self-centering, for it accommodates itself automatically to the head in such a way that the driving torque will be distributed equally between the interengaging surfaces of the different cooperating serrations.

By virtue of this self-centering action and construction of the tool and head serrations with the same included angles, each tool serration engages the corresponding head serration throughout the entire length and throughout the major portion of the width of the latter as determined by the amount of clearance between the tool socket and the screw head and the angle included between the sides of each serration. The tool thus grips each head serration with a true surface contact so that the driving force is distributed uniformly throughout the circumference of the head with a large combined area of effective engagement. This renders it possible to use serrations so shallow as to present to the casual observer a surface treatment having a decorative effect. However, it enables the driving torque to be applied effectually to the screw without danger of deforming any of the serrations or breaking the plating or other decorative finish.

The amount of clearance allowed between the head and tool socket will of course vary with the size of the head. In any case, it should be sufficient to enable the tool to slip onto the head readily and allow for the manufacturing tolerances which are necessary in order to permit high speed methods of manufacture to be employed. It has been found that even with clearances considerably greater than are necessary in order to meet with these requirements, sufficient torque may be applied to twist the head off from its shank without in any way disfiguring the serrations on the head. Therefore, by avoiding unnecessarily large clearances, the desired effective area of gripping engagement may be obtained while at the same time reducing to a minimum the lengths of the serrations 10 and therefore the amount of metal required to form the head.

The driving tool may of course take various forms according to the torque to be applied in driving the screw or tightening the bolt or nut therefor as the case may be. The tool shown herein is adapted for use as an ordinary screw driver, the socket 8 being attached rigidly to the stem 6 with the serrated opening facing axially. Preferably, the radial thickness of the socket at its serrated end is made as small as practicable in order to minimize the size of the counterbore required where screws of the types shown in Figs. 3 and 6 are employed.

Where the tool is used on a nut 5, the socket is formed with an axially extending recess 17 for receiving the projecting end of a bolt, the diameter of the recess adjacent the serrations being sufficient to receive the portion 15 of the fillister type of head. The distance to which the screw head may enter the socket is determined by a shoulder 18 against which the ends of the serrations abut. For some applications, it is desirable to space the shoulder from the end of the socket a distance substantially equal to the axial lengths of the head serrations so that the underside 19 of the head will, in the case of the oval, round and fillister head screws, project slightly beyond the end 20 of the socket as shown in Fig. 9 thereby reducing to a minimum the danger of marring the immediately adjacent surface of the part into which the screw is driven.

In order that the screw heads will fit into the socket of the driving tool and will interengage in the manner above described so as to provide for equal distribution of the driving torque to all of the serrations, it is necessary to form the serrations 10 with a substantial degree of accuracy. For this purpose, it is preferred that the serrations will be formed by a cutting or shearing operation as distinguished from rolling as is commonly done in shaping the metal around the periphery of a thumb screw or the ilke so as to form an irregular surface which may be gripped readily by hand. Since the serrations 10 extend parallel to the axis of the screw and are of larger diameter than the screw shank, they may be cut simultaneously by the shearing action of a tool much in the same way that the hexagonal shapes of ordinary cap screws and bolts are formed. Thus, in manufacture, the wire blanks employed are first formed with a head of the desired shape after which the head is, in the usual way, forced axially through a cutting die shaped similar to the tool socket 8, the metal at the base portion of the head being sheared off to form all of the serrations which will take the form of the die. In this way, the required degree of accuracy in the shape and spacing of the serrations may be obtained inasmuch as the serrated die recess may be cut out with precision in a broaching operation.

It will be apparent that the head construction above described is adapted for manufacture by high speed production methods such as are now commonly employed in the manufacture of headed machine parts. As compared to ordinary screws and bolts with square or hexagonal heads, no greater number of operations is required. Accordingly, the machine and labor costs of the present screw are no higher than those for ordinary hexagonal headed screws and actually are less than for screws having slotted heads. This is for the reason that with present day heading equipment, the trimming operation by which the serrations 10 are formed simultaneously can be effected in the same machine that forges the head on the wire blank; whereas the cutting of a transverse slot in the head requires a separate operation and an extra handling of the blank.

While substantial precision may be obtained in the construction of the trimming dies and in the formation of the tool and head serrations, there will of course be some variations in the sizes of the tool sockets and the screw heads due to inherent manufacturing inaccuracies, wear on the dies, and the like. To compensate for these unavoidable variations and insure that a head of given size will always fit properly in the tool sockets of corresponding size, a substantial degree of normal clearance between the heads and tool sockets of a corresponding size must be provided for but this clearance must not be so great that the effective gripping area will be reduced to an objectionable degree in any case. The provision of the necessary loose fit is made possible by construction of the tool and head serrations for coaction in the manner above described to effect even distribution of the driving torque and the maintenance of the clearance within the narrow limits allowable in view of the short lengths of the serrations is attained by cutting the serrations in the manner above set forth. In this way, it is possible to form screws by high speed production methods and with sufficient accuracy to adapt the screws for general purpose use.

The head construction of the improved screw performs additional functions and possesses numerous other advantages over the slotted, square, or hexagonal constructions ordinarily used. One of the important functions is to lend a neat and artistic appearance to the head as a whole. This is due not only to the uninterrupted and continuous character of the end surface, but also to the serrated border which contributes a symmetrical and decorative effect to the head as a whole. Moreover, owing to their small size and close spacing, the serrations do not appear conspicuous and slight irregularities in their shape due to minor manufacturing inaccuracies are not noticeable to the casual observer. While the smooth convex surfaces of the round and oval head screws present a pleasing appearance, designs of any desired character may be formed on these surfaces.

Screws of the character contemplated may be driven at high speed and with less manual effort than is required for ordinary screws. This is for the reason that only a rotary torque need be applied, thereby entirely eliminating the necessity of exerting an end thrust on the driving tool to maintain proper engagement with the head in tightening or loosening the screw as must be done in driving ordinary slotted screws. Moreover, the turning force is used at better mechanical advantage than with slotted head screws in that the force is applied at a greater radius. With the comparatively wide clearances allowable, the tool socket will slip onto the screw head readily in all angular positions except those of point to point engagement of the serrations in which case only a slight angular shifting of the tool is necessary to bring the parts into interfitting relation. This is an especially advantageous feature where wrenches are used in driving the screws the heads of which are not readily accessible. The provision of a loose fit of the magnitude above described between the serrations of the screw head and tool socket permits of a substantial degree of universal movement between the tool and screw while the latter is being driven, that is to say, the tool may be disposed at a substantial angle to the axis of the screw without reducing the effectiveness of the driving connection between the tool and the screw. The connection thus adapts itself automatically to the changes in the position of the operator's hand which naturally occur during the driving operation. All of these factors combine to enable the screw to be driven in fewer operations and with less tiring effort on the part of the workman than where ordinary screws are employed. Accordingly, driving costs are decreased materially and losses resulting from marring of the screw head or the surrounding surfaces are reduced to a minimum.

A substantially greater turning moment may be applied without danger of splitting or otherwise deforming the head, and the screw may be driven firmly into place and removed any number of times without showing any tool marks. These advantages are attributable to increased leverage obtained for the reasons above mentioned and to the large effective multi-surface area of engagement between the tool and head resulting from the provision of the relatively large number of serrations and the manner in which the tool and screw serrations coact automatically as an incident to driving operation to effect even distribution of the applied driving force over the effective area. In this way, the wear and tear on the driving tools is so reduced that they will outlast ordinary screw drivers in length of service use.

Owing to the more effective manner in which the driving torque is applied to the present screw and the substantially greater total area of effective gripping engagement which can be obtained for a given axial length of the gripping surfaces, it will be apparent that the overall axial dimension of the head may, with the present construction, be reduced to a minimum. Thus, the amount of material required in order to impart to the head the strength necessary to properly resist the driving stresses is substantially less than in ordinary screws and bolts. Accordingly the cost of material is reduced.

While the tools required are of special character, their cost is no greater and in some instances actually less than the tools for driving ordinary screws and bolts. Considering the nature of the tool, it will be apparent that the cost of production will be substantially the same as in the case of socket wrenches commonly used on hexagonal headed parts. It has been found that the tools can be manufactured at a lower cost than an ordinary high grade screw driver. This is for the reason that less costly forming and hardening operations are required and less costly material may be employed. For example, the tool shank 6 may be made of low priced steel and the socket may be formed from steel in which the serrations may be cut by a simple broaching operation and the socket then case-hardened.

As used herein, the terms "wood and machine screws" refer to any general purpose metal screw, bolt or the nut therefor intended to produce a clamping action for fastening two or more parts together and to be turned and tightened into place by a torque applied thereto through the medium of a driving tool arranged for engagement with non-radial gripping surfaces on the screw head. Among the screws of this class are ordinary wood screws, so-called machine screws and bolts, cap screws, drive screws, lag screws, sheet metal screws, stove bolts, set screws and the like. The terms "loose fit" as used in the claims contemplate a degree of clearance between the tool socket and the screw heads of corresponding size which will permit of ready entry of the head into the socket notwithstanding variations in the size of the head and tool socket occurring as an incident to the formation of the serrations by the high speed production methods above described.

The present application is a continuation in part of my prior application Serial No. 699,845, filed December 27, 1933.

I claim as my invention:

1. The combination of a screw-driving tool having a head-receiving socket formed with internal teeth and intervening notches extending parallel to the socket axis, a threaded fastening element to be turned by said tool comprising a metal head having fine teeth formed around its periphery parallel to its axis and adapted to be received in the notches of said tool and to engage the surfaces of said teeth when the tool is rotated, the internal radius of said socket at the roots of said notches being greater than the radius of said head at the tips of teeth thereon whereby to provide radial clearance for facilitating entry of said head in said socket, the engaging surfaces of the teeth on said head and tool being disposed at approximately forty-five degrees with respect to a radius therethrough and coacting during application of turning torque to said tool to cam said head automatically to centered position in said socket.

2. The combination of a driving tool having a head-receiving socket formed around its internal annular surface with a multiplicity of fine V-shaped teeth with flat side surfaces extending parallel to the socket axis and a metal screw element comprising a threaded portion and a head integral therewith serrated around its periphery to form a multiplicity of fine V-shaped teeth extending parallel to the screw axis and having contiguous flat surfaces substantially intersecting at the tips of the teeth and the roots of the intervening notches, said tool teeth having a greater pitch diameter than the head teeth whereby the latter are received in said notches with a loose fit, and the tool and head teeth having equal included angles sufficiently large to cause movement of the complemental surfaces into full face contact automatically during turning of the tool, the driving torque applied to said tool being thereby distributed evenly to all of the interengaging surfaces.

3. The combination of a general purpose wood or machine screw having a threaded shank and a circular head integral therewith formed around its periphery with a multiplicity of uniformly spaced V-shaped notches extending parallel to the screw axis and a driving tool having a socket with an internal annular surface formed with a multiplicity of V-shaped teeth and having a size adapted to receive said head with a loose fit, said teeth and notches being defined by interengaging flat side surfaces similarly disposed relative to the screw and socket axes so as to move into full face engagement as an incident to a relatively slight turning of said socket about said head, and all of said teeth engaging the corresponding head surfaces simultaneously whereby to effect even distribution of the driving torque over the interengaging surfaces.

4. The combination of a screw-driving tool with a head-receiving socket having a finely serrated internal annular surface defining a multiplicity of closely and uniformly spaced V-shaped teeth with flat side surfaces substantially intersecting with each other and extending parallel to the socket axis, and a general purpose wood or machine screw comprising a threaded shank, an enlarged circular head having a cylindrical periphery formed with fine flat-sided V-shaped serrations substantially complemental to the tool notches and fitting therein with sufficient looseness to insure that the head will invariably enter the tool socket while providing multiple surface engagement between said teeth and serrations during turning of said tool, and a convexly curved end surface upstanding from and merging with the ends of said serrations, said end surface coacting with the end of said tool socket to guide the latter laterally into alinement with said head whereby to cause interfitting of said head and socket without appreciable turning of the tool in substantially any angular relation of the socket and head.

5. The combination of a driving tool having a head-receiving socket formed around its internal annular surface with a multiplicity of fine V-shaped teeth extending parallel to the socket axis and a general purpose fastening element comprising a metal shank formed externally with a wood or machine screw thread and an enlarged circular head integral with said shank and serrated around its periphery to form a multiplicity of fine V-shaped teeth extending parallel to the screw axis and having notches therebetween substantially complemental to said tool teeth, said tool teeth having a greater pitch diameter than the head teeth whereby the latter are received in said notches with a loose fit, and the tool and head teeth having included angles sufficiently large to cause automatic centering of said head in said socket during turning of the tool and thereby effect even distribution of the driving torque to all of the interengaging surfaces.

ARTHUR V. GULLBORG.